United States Patent Office 3,522,244
Patented July 28, 1970

3,522,244
SALTS OF BETA-(PYRIDYL ALKYL) AMINES WITH 21 - HYDROXY STEROID POLYVALENT ACID ESTERS
Eric T. Fossel, Lexington, Mass., assignor to Unimed, Inc., Morristown, N.J.
No Drawing. Filed Sept. 12, 1967, Ser. No. 667,084
Int. Cl. C07c 173/00
U.S. Cl. 260—239.5       8 Claims

ABSTRACT OF THE DISCLOSURE

This invention relates to steroid derivatives with reduced side effects, and more particularly to salts of beta-2- or 4-(pyridyl alkyl) amines and a 21-polyvalent e.g. polycarboxylic acid ester of a 21-hydroxy steroid.

BACKGROUND OF THE INVENTION

Various steroids, for example of the androstane, testane, pregnane, cholestane, etc. series, are well known and their use for various purposes such as anti-inflammatory agents, treatment of allergic diseases, as anabolic agents, as androgenic agents, etc., is also well known. Equally well known is the fact that the use of these steroids is generally accompanied by undesired side effects such as iatrogenic (or physician induced) Cushing's disease, sodium retention and potassium excretion with edema, hypertension, hyperglycemia, glycosuria, etc. In many cases, the side effects of the administration of the corticosteroids are so great that continued use thereof becomes impossible despite the need for the steroid effect. Thus, it is often necessary to give doses below the desired dose and in addition it is often necessary to discontinue treatment with the steroid when continued treatment would be desirable except for the undesired side effects which take place.

A constant search has been in effect in the art to try to produce steroid derivatives which have the desired steroid effect without, however, having the undesired side effect that generally accompany the use of the steroids.

SUMMARY OF THE INVENTION

Generally speaking, in accordance with the present invention, there are provided steroid derivatives of 21-hydroxy steroids which are esterified by a polyvalent, e.g. polycarboxylic acid with the free acid, e.g. carboxyl group being further linked to the amine group of a beta-2- or 4-(pyridyl alkyl) amine, forming a salt therewith. It has been found that derivatives of this type have the same action as the original steroid from which the derivative is formed, without, however, having the undesired side effects of the said original steroid.

It is accordingly a primary object of the present invention to provide new steroid derivatives which permit the use of the steroids but which have lowered side effects.

It is yet another object of the present invention to provide methods of producing the new steroid derivatives of this invention.

It is still a further object of the present invention to provide new steroid derivatives of known steroid bases, which steroid derivatives can be used in the same manner and for the same purposes as the original steroid bases, but with lessened side effects so that larger doses can be administered and the administration can be continued over longer periods of time without undesired side effects occurring.

Other objects and advantages of the present invention will be apparent from a further reading of the specification and of the appended claims.

With the above and other objects in view, the present invention mainly comprises a steroid derivative of the formula:

(I)

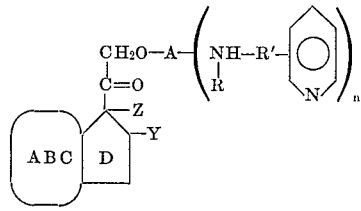

wherein ABC stand for the A, B and C rings of a steroid of any steroid series, e.g. androstane, testane, pregnane, cholestane, etc. (including the dehydro members thereof such as androstenes, testenes, pregnenes, etc.), wherein D is the D ring of said steroid, wherein Y is selected from the group consisting of hydrogen and lower alkyl (alpha or beta oriented), wherein Z is selected from the group consisting of hydrogen and hydroxyl (alpha oriented), wherein A is the residue of an esterified polyvalent acid esterified at the 21-position of said steroid and further imidized on at least one remaining acid group e.g. carboxyl group with the shown pyridyl alkyl amine, wherein R is lower alkyl such as methyl, ethyl, etc., wherein R′ is a lower alkylene group such as —CH$_2$— or —CH$_2$—CH$_2$— or —CH$_2$—CH$_2$—CH$_2$—, etc., wherein R′ is linked to the pyridyl ring at the 2- or 4-position and wherein n is a whole number from 1-5. The number n can be greater than 1 only if A has more than two carboxylic groups. Of course, even if A has more than two carboxylic groups, then n can still be 1, but n cannot be greater than the number of carboxyl groups of A less 1.

It will be seen from the above that the invention is applicable to a wide range of steroids including, but not limited to cortisone and its derivatives, hydrocortisone and its derivatives, prednisone, dexamethasone, corticosterone and its derivatives such as 11-dihydrocorticosterone and 11-desoxycorticosterone, aldosterone, etc.

The derivatives of the present invention may be used for the same purposes as the original steroid from which the same are derived, however with greater safety and with reduced side effects. Thus, for example, a cortisone derivative according to the present invention would be cortisone-21-beta-histine succinate. This compound may be used for the same purposes as cortisone, e.g. as an anti-inflammatory agent, in the treatment of allergic diseases, etc. Moreover, the compound of the present invention may be used in the same manner as cortisone, e.g. by oral administration, in topical form as an ointment, etc. However, the compound of the present invention possesses the advantage of lesser toxicity than cortisone itself.

The polyvalent acid which is linked to the steroid at the 21-position and is also linked to the beta-2- or 4-(pyridyl alkyl)amine may be an inorganic acid such as sulfuric acid, phosphoric acid, and the like, or it may be a polycarboxylic acid including dicarboxylic acids such as succinic acid, fumaric acid, maleic acid, citric acid, isocitric acid, etc. or it may be a polycarboxylic acid of more than two carboxyl groups.

Among the suitable tricarboxylic acids are:

propane 1,1,2-tricarboxylic acid
propane 1,2,2-tricarboxylic acid
butane 1,1,2-tricarboxylic acid
butane 1,2,2-tricarboxylic acid
butane 1,1,3-tricarboxylic acid
isobutane 1,1,2-tricarboxylic acid
pentane 2,2,4-tricarboxylic acid
2-methyl propane 1,1,3-tricarboxylic acid
2-methyl butane 1,1,3-tricarboxylic acid
2-methyl butane 1,3,3-tricarboxylic acid 3-methyl pentane 2,2,4-tricarboxylic acid
alpha-carboxy beta,beta-dimethyl glutaric acid
1,1,2-trimethyl carballylic acid (camphoronic acid)
4-methyl pentane 1,3,4-tricarboxylic acid
cis and trans alpha-methyl tricarballylic acid
alpha-ethyl tricarballylic acid
alpha-propyl tricarballylic acid
alpha-isopropyl tricarballylic acid
alpha,alpha'-dimethyl tricarballylic acid
alpha,beta-dimethyl tricarballylic acid
alpha-alpha-dimethyl tricarballylic acid
butane 1,2,4-tricarboxylic acid
pentane 1,3,4-tricarboxylic acid
pentane 1,3,5-tricarboxylic acid
aconitic acid (2-carboxy glutaconic acid)
1-methyl aconitic acid
1,3-dimethyl aconitic acid
3,3-dimethyl aconitic acid, and
2-pentene 2,3,5-tricarboxylic acid.

The above tricarboxylic acids can be used to form steroid derivatives having either one or two molecules of the beta-2- or 4-(pyridyl alkyl) amine linked to the molecule.

Using a tetracarboxylic acid it is possible to link one molecule of the steroid to from one to three molecules of the beta-2- or 4-(pyridyl alkyl) amine. Among the suitable tetracarboxylic acids that can be used for this purpose are:

ethane 1,1,2,2-tetracarboxylic acid
methylene bis malonic acid (propane 1,1,3,3-tetracarboxylic acid)
2-methyl propane 1,1,3,3-tetracarboxylic acid
butane 1,1,4,4-tetracarboxylic acid
pentane 1,1,5,5-tetracarboxylic acid
propane 1,1,2,3-tetracarboxylic acid
propane 1,2,2,3-tetracarboxylic acid
butane 1,1,3,4-tetracarboxylic acid
pentane 2,2,3,4-tetracarboxylic acid
methane tetraacetic acid
ethylene tetracarboxylic acid
propylene 1,1,3,3-tetracarboxylic acid (1,3-dicarboxy glutaconic acid)

The beta-2- or 4-(pyridyl alkyl) amines with which the 21-carboxylic acid ester of the steroid is linked include all of the compounds of the formula:

(II) 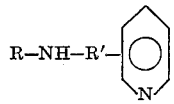

R—NH—R'— wherein R and R' have the same definitions as above, with R' being linked to the pyridyl ring at the 2- or 4-position, e.g. beta-(2-pyridyl)-ethylmethyl amine; beta-(4-pyridyl)-ethylmethyl amine; beta-(2-pyridyl)-ethyl amine; 1-(2-pyridyl)-2-methyl amino propane, etc.

The method of manufacture of the compounds of the present invention is quite simple. A partial ester of the steroid and a polyvalent alcohol at the 21-position, e.g. cortisone-21-hemisuccinate, is dissolved in a polar solvent such as acetone, ethanol, methanol, etc. To this is added the beta-2- or 4-(pyridyl alkyl) amine. The amount of the beta-2- or 4-(pyridyl alkyl) amine depends upon the number of free carboxyl groups of the steroid ester and the number of molecules of the beta-2- or 4-(pyridyl alkyl) amine that it is intended to link to the steroid ester. One molecule of the beta-2- or 4-(pyridyl alkyl) amine is used for each free carboxyl group that it is intended to be linked with. The solvent is then removed under reduced pressure, without use of external heat. It should be noted that the reaction is carried out in a polar organic solvent, and not in water as the solvent. If water is used as the solvent, a brownish-black product, which is non-crystalline is obtained, which does not have the desired structure. The reason for this is probably that the pyridyl alkyl amines are extremely hygroscopic so that the reaction does not proceed properly.

DESCRIPTION OF PREFERRED EMBODIMENTS

The following examples are given to further illustrate the present invention. The scope of the invention is not, however, meant to be limited to the specific details of the examples:

Example 1

This example illustrates the production of hydrocortisone-21-beta-histine succinate of the formula:

(III) 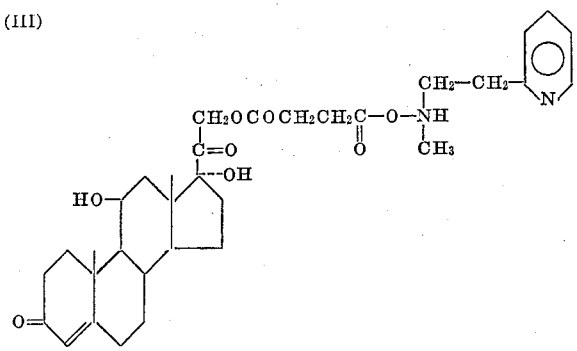

1 g. of hydrocortisone hemisuccinate (made according to a standard preparation) is dissolved in 15 ml. of absolute ethanol. To this is added 0.294 g. (1 equivalent) of beta-histine. The solution is placed in a shallow dish in a desiccator and vacuum is applied (25 mm. Hg) until the solvent is removed. This is all done at room temperature—no external heat is applied. The resulting material weighs 1.29 g. (quantitative yield) and melts at 61–65° C. C, H, and N determination confirm the composition to be a 1:1 salt of hydrocortisone hemisuccinate and beta-histine. The compound is crystalline.

Example 2

This example describes the production of cortisone 21-beta-histine succinate of the formula:

(IV) 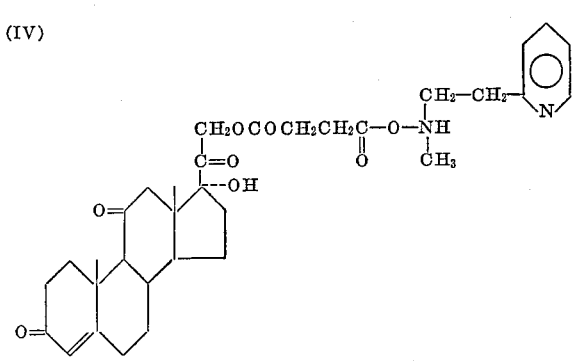

1 g. of cortisone hemisuccinate (made by standard procedures) is dissolved in 15 ml. of absolute ethanol. To this solution is added 0.295 g. of beta-histine. The solution is placed in a shallow dish in a desiccator and vacuum is applied (25 mm. Hg) until the solvent is removed. This is all done at room temperature no external heat is applied. The resulting material weighs 1.29 g. and melts at 61–64° C. C, H and N determination confirm the composition to be a 1:1 salt of cortisone hemisuccinate and beta-histine. The compound is crystalline.

Example 3

This example describes the production of hydrocortisone-21-di-beta-histine tricarballylate of the formula:

(V)

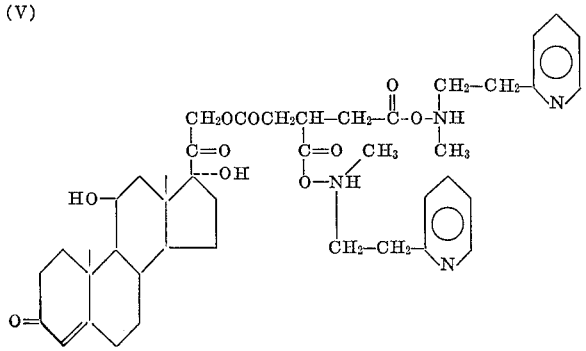

5.0 g. of hydrocortisone-21-hemi-tricarballylate (a known compound made by a known procedure) is added to 75 ml. of absolute ethanol. To the resulting solution is added 2.62 g. (2 equivalents) of beta-histine. The solution is put in a shallow dish in a desiccator and vacuum is applied (25 mm. Hg) until all the solvent is removed. The resulting product weighs 7.62 g. (quantitative yield) and melts at 55–58° C. The compound is crystalline.

It is believed that from the foregoing adaptations and variations of the invention can be made without departing from the essential characteristics thereof.

I claim:

1. A compound of the formula:

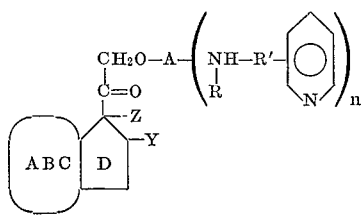

wherein ABC stands for the A, B and C rings of an antiinflammatory steroid, wherein D is the D ring of said steroid, wherein Y is selected from the group consisting of hydrogen and alpha-oriented and beta-oriented lower alkyl, wherein Z is selected from the group consisting of hydrogen and alpha-oriented hydroxyl, wherein A is the residue of an esterified polyvalent acid esterified at the 21-position of said steroid and being further imidized at at least one remaining acid group thereof with the shown pyridyl alkyl amine, wherein R is lower alkyl, wherein R' is a lower alkylene with R' linked to the pyridyl ring at a position selected from the group consisting of the 2-position and the 4-position of said pyridyl ring, and wherein n is a whole number from 1–3.

2. Compound according to claim 1 wherein the steroid is selected from the group consisting of cortisone and hydrocortisone.

3. Compound according to claim 1 wherein A is the residue of a polycarboxylic acid.

4. Compound according to claim 1 wherein A is the residue of a tricarboxylic acid and n is 2.

5. Compound according to claim 1 wherein R is methyl and wherein R' is —$CH_2$—$CH_2$—.

6. Compound according to claim 1 wherein said compound is hydrocortisone-21-beta-histine succinate.

7. Compound according to claim 1 wherein said compound is cortisone-21-beta-histine succinate.

8. Compound according to claim 1 wherein said compound is hydrocortisone-21-di-beta-histine tricarballylate.

References Cited

UNITED STATES PATENTS

| | | | |
|---|---|---|---|
| 3,089,881 | 5/1963 | Hershberg et al. | 260—397.45 |
| 3,152,044 | 10/1964 | Griebsch et al. | 424—243 |
| 3,193,459 | 7/1965 | Korman et al. | 424—243 |
| 3,248,408 | 4/1966 | Grier et al. | 260—397.45 |

LEWIS GOTTS, Primary Examiner

E. G. LOVE, Assistant Examiner

U.S. Cl. X.R.

260—239.55; 424—241